US010309353B2

United States Patent
Nakamura et al.

(10) Patent No.: US 10,309,353 B2
(45) Date of Patent: Jun. 4, 2019

(54) ENGINE SYSTEM AND INTAKE MANIFOLD USED THEREFOR

(71) Applicant: AISAN KOGYO KABUSHIKI KAISHA, Obu-shi, Aichi-ken (JP)

(72) Inventors: Takehide Nakamura, Handa (JP); Shinji Kawai, Gifu (JP); Daigo Oyabu, Chiryu (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 60 days.

(21) Appl. No.: 15/820,091

(22) Filed: Nov. 21, 2017

(65) Prior Publication Data

US 2018/0171944 A1  Jun. 21, 2018

(30) Foreign Application Priority Data

Dec. 21, 2016  (JP) .................................. 2016-248341

(51) Int. Cl.
*F02M 35/104* (2006.01)
*F02M 35/10* (2006.01)
*F02M 26/06* (2016.01)

(52) U.S. Cl.
CPC .......... *F02M 35/104* (2013.01); *F02M 26/06* (2016.02); *F02M 35/10157* (2013.01); *Y02T 10/144* (2013.01)

(58) Field of Classification Search
CPC ........... F02M 35/104; F02M 35/10157; F02M 26/06; Y02T 10/144
USPC ....................................... 60/600, 605.1–612
See application file for complete search history.

(56) References Cited

U.S. PATENT DOCUMENTS

| 4,282,713 A * | 8/1981 | Antoku | F02B 37/16 60/600 |
| 2006/0191505 A1 | 8/2006 | Doko et al. | |
| 2009/0277431 A1 * | 11/2009 | Nitzke | F02D 9/04 123/568.12 |
| 2011/0023482 A1 * | 2/2011 | Styles | F02M 26/08 60/605.2 |
| 2011/0289916 A1 * | 12/2011 | Dion | F02F 1/186 60/605.2 |

(Continued)

FOREIGN PATENT DOCUMENTS

| JP | 2006-241992 A | 9/2006 |
| JP | 2012-57582 A | 3/2012 |

(Continued)

*Primary Examiner* — Hoang M Nguyen
(74) *Attorney, Agent, or Firm* — Oliff PLC (57) ABSTRACT

An engine system includes an engine provided with a supercharger provided in an intake passage and an exhaust passage, an LPL-type EGR device, an intake manifold placed immediately upstream of the engine, an electric throttle device placed in the intake passage upstream of the intake manifold, a fresh air inflow passage introducing fresh air into the intake passage downstream of the electric throttle device, and a fresh air inflow valve to regulate the fresh air amount. The intake manifold includes a surge tank and branch pipes branching off from the surge tank. The fresh air inflow passage includes an inlet connected to the intake passage upstream of an outlet port of the EGR passage. A fresh air distribution pipe distributing the fresh air to each of the branch pipes of the intake manifold is provided on an outlet side of the fresh air inflow passage.

4 Claims, 11 Drawing Sheets

(56) References Cited

U.S. PATENT DOCUMENTS

2015/0292424 A1* 10/2015 Surnilla ............... F02D 41/005
                                                                           60/605.2

FOREIGN PATENT DOCUMENTS

| JP | 2015-10591 A | 1/2015 |
| JP | 2015-40549 A | 3/2015 |

* cited by examiner

ENGINE SYSTEM AND INTAKE MANIFOLD USED THEREFOR

CROSS-REFERENCE TO RELATED APPLICATIONS

This application is based upon and claims the benefit of priority from the prior Japanese Patent Application No. 2016-248341, filed Dec. 21, 2016, the entire contents of which are incorporated herein by reference.

BACKGROUND

Technical Field

The present disclosure relates to an engine system provided with a low-pressure-loop type exhaust gas recirculation apparatus and an intake manifold used for the engine system.

Related Art

One example of this type of technique has been known as an engine system of JP2015-040549A. This engine system is provided with an engine, an intake passage and an exhaust passage each communicating with a plurality of cylinders of the engine, an electric throttle device for regulating an intake amount of intake air flowing through the intake passage, a supercharger provided in the intake passage upstream of the electric throttle device and the exhaust passage, a low-pressure-loop type EGR apparatus allowing a part of exhaust gas discharged from each cylinder of the engine to the exhaust passage to flow into the intake passage and recirculating the part of the exhaust gas to the engine as EGR gas, a fresh air inflow passage to introduce fresh air to the intake passage downstream of the electric throttle device, and a fresh air inflow valve to regulate a fresh air flow rate in the fresh air inflow passage. The EGR apparatus includes an EGR passage having an inlet port connected to the exhaust passage and an outlet port connected to the intake passage upstream of a compressor of the supercharger. An intake manifold including a surge tank and a plurality of branch pipes is further provided in the intake passage downstream of the electric throttle device, and the intake manifold is configured such that intake air flowing in the surge tank is distributed in each cylinder of the engine via each of the branch pipes. An outlet of the fresh air inflow passage is connected to the intake passage downstream of the electric throttle device and upstream of the surge tank. An inlet of the fresh air inflow passage is connected to the intake passage upstream of both the compressor and the outlet of the EGR passage.

The above-mentioned engine system is configured such that, during deceleration of the engine, the EGR valve having been opened is closed to inhibit introduction of the EGR gas into the intake passage, and that the fresh air inflow valve having been closed is opened to introduce fresh air into the intake passage upstream of the surge tank. Thus, the EGR gas remaining in the surge tank and the residual EGR gas remaining in the intake passage upstream of the electric throttle device or further flowing through the intake passage downstream of the electric throttle device are diluted with the fresh air so that EGR for the engine is attenuated to prevent misfire on deceleration of the engine.

SUMMARY

Technical Problems

The engine system of JP2015-040549A as mentioned above includes a surge tank with a certain amount of volume, and accordingly, it is difficult to quickly dilute the residual EGR gas remaining in the surge tank with the fresh air introduced upstream of the tank. Thus, it has been difficult to promptly lower concentration of the residual EGR gas during deceleration of the engine, thus requiring long time for EGR attenuation. In that sense, prevention means for deceleration misfire has not been enough.

The present disclosure has been made in view of the above circumstance, and has an object to provide an engine system and an intake manifold used for the engine system enabling prompt reduction in concentration of residual exhaust gas recirculation gas which is introduced in an engine during deceleration of the engine.

Means of Solving the Problems

To achieve the above object, one aspect of the present disclosure provides an engine system comprising: an engine including a plurality of cylinders; an intake passage configured to introduce intake air into the respective cylinders of the engine; an exhaust passage allowing exhaust gas to flow out of the engine; a supercharger provided in the intake passage and in the exhaust passage to increase intake pressure in the intake passage, wherein the supercharger includes a compressor placed in the intake passage, a turbine placed in the exhaust passage, and a rotary shaft integrally rotatably connecting the compressor and the turbine; an intake manifold placed in the intake passage immediately upstream of the engine, the intake manifold including a surge tank to which the intake air is introduced and a plurality of branch pipes configured to distribute the intake air introduced in the surge tank to the respective cylinders of the engine; an intake amount regulation valve placed in the intake passage upstream of the intake manifold, the intake amount regulation valve configured to regulate an intake amount of the intake air flowing in the intake passage; an exhaust gas recirculation apparatus including an exhaust gas recirculation passage configured to allow a part of exhaust gas discharged from the engine to the exhaust passage to flow in the intake passage as exhaust gas recirculation gas and to be recirculated into the engine, and an exhaust gas recirculation valve configured to regulate an exhaust gas recirculation gas flow rate in the exhaust gas recirculation passage, wherein the exhaust gas recirculation passage includes an inlet port connected to the exhaust passage downstream of the turbine and an outlet port connected to the intake passage upstream of the compressor; a fresh air inflow passage configured to introduce fresh air to the intake passage downstream of the intake flow rate regulation valve, wherein the fresh air inflow passage includes an inlet connected to the intake passage upstream of the outlet port of the exhaust gas recirculation passage; a fresh air inflow valve configured to regulate a fresh air amount of fresh air flowing in the fresh air inflow passage, wherein the engine system is provided with a fresh air distribution member on an outlet side of the fresh air introduction passage to distribute the fresh air into each of the branch pipes of the intake manifold.

According to the present disclosure, the concentration of the residual exhaust gas recirculation gas which is to be introduced in each cylinder of the engine during the engine deceleration can be promptly reduced. Thus, misfire of the engine due to the residual exhaust gas recirculation gas can be further surely prevented during the engine deceleration.

DETAILED DESCRIPTION OF THE EXEMPLARY EMBODIMENTS

First Embodiment

A first embodiment embodying an engine system and an intake manifold used therefor in a gasoline engine system is now explained with reference to the accompanying drawings.

Figure 1:
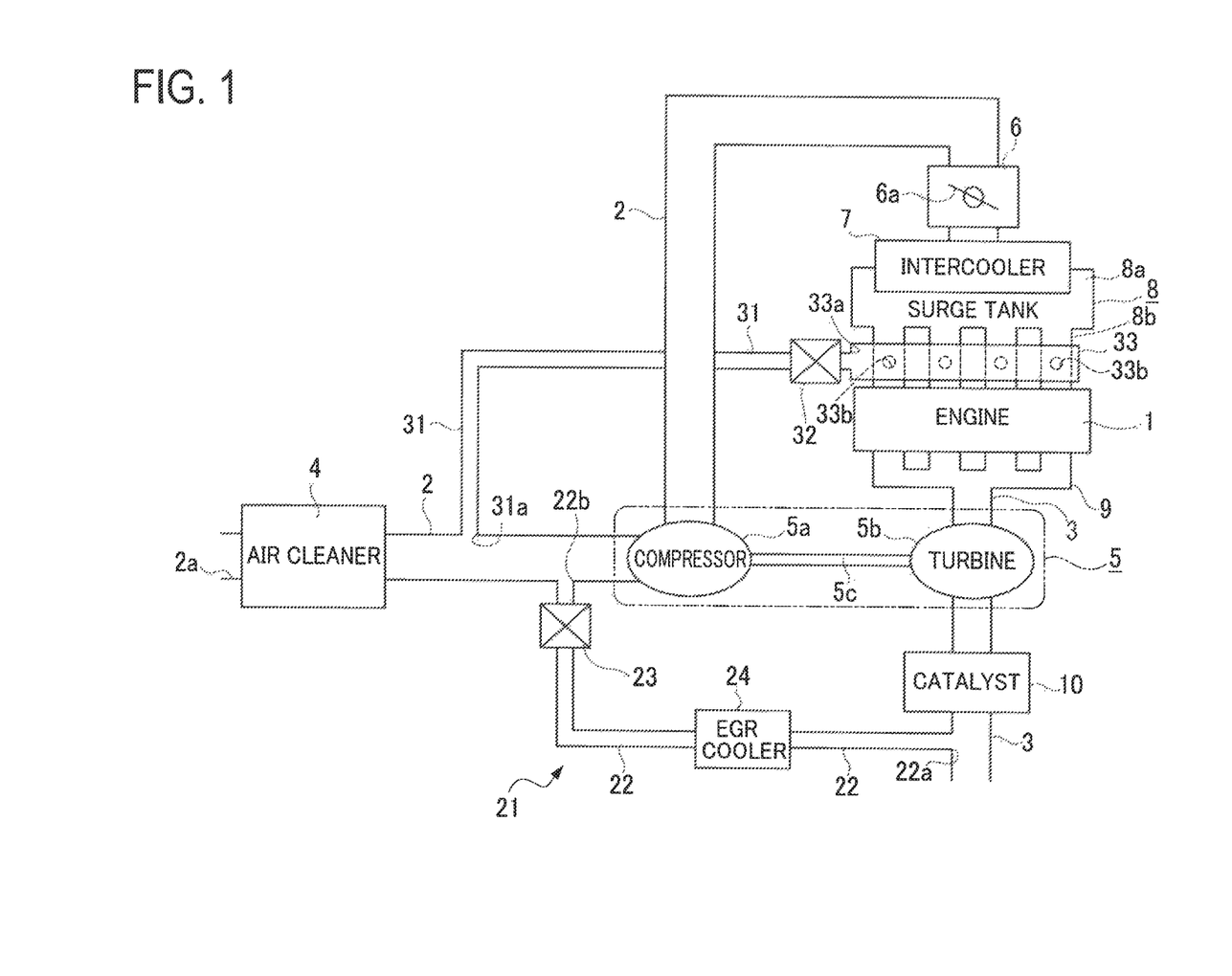
FIG. 1 is a schematic configurational view of a gasoline engine system in a first embodiment.

FIG. 1 is a schematic configurational view of a gasoline engine system according to the present embodiment. The gasoline engine system mounted in an automobile includes an engine 1 provided with a plurality of cylinders. This engine 1 is a four-stroke cycle reciprocating engine with four cylinders and includes known components such as a piston and a crankshaft. The engine 1 is provided with an intake passage 2 to introduce intake air into each cylinder and an exhaust passage 3 to allow exhaust gas to flow out of each cylinder of the engine 1. A supercharger 5 is provided in a position between the intake passage 2 and the exhaust passage 3. The intake passage 2 is provided with an intake inlet 2a, an air cleaner 4, a compressor 5a of the supercharger 5, an electric throttle device 6, an intercooler 7, and an intake manifold 8 in this order from an upstream side.

The electric throttle device 6 is placed in the intake passage 2 upstream of the intake manifold 8 to drive a butterfly-type throttle valve 6a by changing its opening degree in accordance with acceleration operation by a driver so that an intake flow rate of intake air flowing in the intake passage 2 is regulated. The electric throttle device 6 corresponds to one example of an intake flow rate regulation valve of the present disclosure. The intake manifold 8 is placed in the intake passage 2 immediately upstream of the engine 1 and includes a surge tank 8a to introduce the intake air and a plurality of (four) branch pipes 8b to distribute the intake air introduced in the surge tank 8a to each cylinder of the engine 1. The exhaust passage 3 is provided with an exhaust manifold 9, a turbine 5b of the supercharger 5, and a catalyst 10 in this order from an upstream side. The catalyst 10 is provided to purify the exhaust gas and constituted by three-way catalyst, for example.

The supercharger 5 for increasing pressure of the intake air in the intake passage 2 includes the compressor 5a placed in the intake passage 2, the turbine 5b placed in the exhaust passage 3, and a rotary shaft 5c connecting the compressor 5a and the turbine 5b in an integrally rotatable manner. When the turbine 5b is operated to rotate by the flow of the exhaust gas and the compressor 5a is then operated to rotate in association with rotation of the turbine 5b, the pressure of the intake air flowing in the intake passage 2 is increased. The intercooler 7 cools down the intake air which has been increased its pressure by the compressor 5a.

The engine 1 is provided with fuel injection devices (not shown) each corresponding to each of the cylinders to inject fuel. The fuel injection devices are each configured to inject fuel which is supplied from a fuel supply device (not shown) into each cylinder of the engine 1. In each cylinder, the fuel injected from the fuel injection device and the intake air introduced from the intake manifold 8 are mixed to form combustible gas mixture.

The engine 1 is further provided with ignition devices (not shown) each corresponding to each of the cylinders. The ignition devices are each configured to ignite the combustible gas mixture in each cylinder. The combustible gas mixture in each cylinder is exploded and set on fire by ignition operation of the ignition device, and the exhaust gas after combustion is discharged outside through each cylinder, the exhaust manifold 9, the turbine 5b, and the catalyst 10. At this time, a piston (not shown) in each cylinder makes an upward and downward motion to rotate a crankshaft (not shown), thus applying motive power to the engine 1.

The gasoline engine system of the present embodiment is provided with a low-pressure-loop type exhaust gas recirculation apparatus (EGR apparatus) 21. This EGR apparatus 21 is provided with an exhaust gas recirculation passage (EGR passage) 22 to allow a part of the exhaust gas, which has been flown out of each cylinder to the exhaust passage 3 as the exhaust gas recirculation gas (EGR gas), to flow into the intake passage 2 to further recirculate the gas into each cylinder of the engine 1, and provided with an exhaust gas recirculation valve (EGR valve) 23 to regulate an EGR gas flow rate in the EGR passage 22. The EGR passage 22 includes an inlet port 22a and an outlet port 22b. The inlet port 22a of the EGR passage 22 is connected to the exhaust passage 3 downstream of the catalyst 10, and the outlet port 22b of the EGR passage 22 is connected to the intake passage 2 upstream of the compressor 5a. Further, in the EGR passage 22 upstream of the EGR valve 23, an EGR cooler 24 for cooling the EGR gas is provided.

The EGR valve 23 of the present embodiment is constituted by an electric valve changeable in its opening degree. This EGR valve 23 has preferably characteristics of a large flow rate, high responsivity, and high resolution. Thus, in the present embodiment, "a double offset butterfly valve" described in JP Patent No. 5759646 may be adopted as a configuration of the EGR valve 23, for example. This double offset butterfly valve is configured to deal with a large flow rate control.

In a supercharging region where the supercharger 5 is operated (where the inflow rate is relatively large) in the gasoline engine system, the EGR valve 23 is opened to allow the part of the exhaust gas flowing through the exhaust passage 3 as the EGR gas to flow from the inlet port 22a to the EGR passage 22, and the EGR gas is further let flown in the intake passage 2 via the EGR cooler 24 and the EGR valve 23, and thus the EGR gas is recirculated into each cylinder of the engine 1 through the compressor 5a, the electric throttle device 6, the intercooler 7, and the intake manifold 8.

In the present embodiment, the intake passage 2 is provided with a fresh air inflow passage 31 to introduce fresh air to the intake passage 2 downstream of the electric throttle device 6. The fresh air inflow passage 31 includes an inlet 31a which is connected to the intake passage 2 upstream of the outlet port 22b of the EGR passage 22. Further, the fresh air inflow passage 31 is provided with a fresh air inflow valve 32 to regulate a flow rate of the fresh air flowing in the passage 31. On an outlet side of the fresh air inflow passage 31 is provided with a fresh air distribution pipe 33 to distribute fresh air to each of the branch pipes 8b of the intake manifold 8. To be specific, an outlet side of the fresh air inflow passage 31 is connected to the intake passage 2 (the intake manifold 8) downstream of the electric throttle device 6 via the fresh air distribution pipe 33. The fresh air distribution pipe 33 formed in a long pipe-like shape is provided in the intake manifold 8 to extend across a plurality of the branch pipes 8b. The fresh air distribution pipe 33 includes a fresh air inlet 33a to introduce fresh air and a plurality of fresh air outlets 33b each formed to correspond to each of the branch pipes 8b so that the respective fresh air outlets 33b are communicated with the respective branch pipes 8b. The fresh air inlet 33a is provided on one end in a longitudinal direction of the fresh air distribution pipe 33. The outlet side of the fresh air inflow passage 31 is connected to this fresh air inlet 33a via the fresh air inflow valve 32. Thus, an entire volume from the fresh air inflow valve 32 to the respective branch pipes 8b is made small. In the present embodiment, the fresh air distribution pipe 33 corresponds to one example of a fresh air distribution member of the present disclosure.

According to the above-explained embodiment of the gasoline engine system, during deceleration of the engine 1, the throttle valve 6a of the electric throttle device 6 having been opened is almost fully closed (in a state in which a certain amount of intake air is allowed to pass through). Thus, the intake air flowing through the electric throttle device 6 to the intake manifold 8 and the engine 1 is narrowed. At this time, the EGR valve 23 having been opened is also closed to shut off inflow of the EGR gas from the EGR passage 22 to the intake passage 2. However, a volume of the surge tank 8a of the intake manifold 8 is relatively large, and accordingly the EGR gas remains in the tank 8a. The EGR gas further keeps remaining in the passage because the intake passage 2 extends relatively long from the outlet port 22b of the EGR passage 22 to the electric throttle device 6 with a certain amount of volume. This residual EGR gas is allowed to gradually flow in the surge tank 8a through a clearance of the electric throttle device 6 (a slight clearance of the throttle valve 6a). The fresh air inflow valve 32 having been closed is opened at that time, and thus the fresh air is made to flow through the fresh air inflow passage 31 and the fresh air branch pipe 33 to each of the branch pipes 8b of the intake manifold 8. This fresh air dilutes the EGR gas remaining in the surge tank 8a and the residual EGR gas flowing from the intake passage 2 upstream of the electric throttle device 6 to the surge tank 8a through the electric throttle device 6 in the branch pipes 8b during deceleration of the engine 1, and thus concentration of the residual EGR gas introduced in each cylinder of the engine 1 can be quickly lowered. Namely, the EGR rate can be promptly attenuated. This surely prevents misfire of the engine 1 caused by the residual EGR gas during deceleration of the engine 1.

Figure 2:
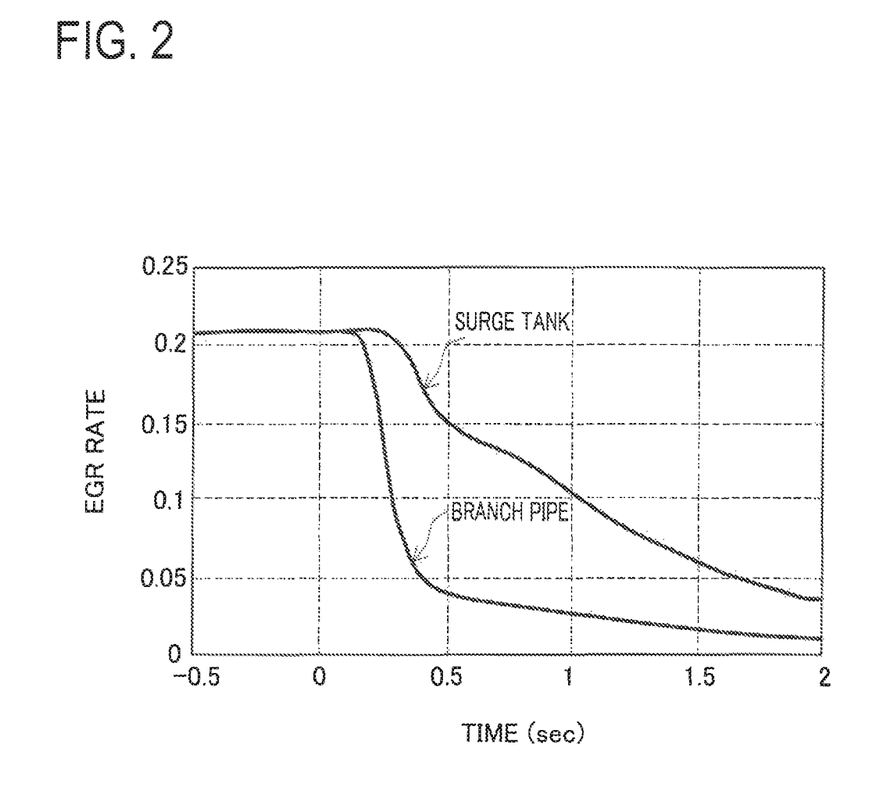
FIG. 2 is a time chart showing behavior of EGR rates in a surge tank and branch pipes in the first embodiment.

FIG. 2 is a time chart showing behavior of the EGR rate in the surge tank 8a of the intake manifold 8 and in the branch pipes 8b of the intake manifold 8. As shown in FIG. 2, when deceleration of the engine 1 gets started at a time indicated as "0", the EGR rate (about 0.21) before starting deceleration is abruptly attenuated to "0.05" before the time of "0.5 seconds" has passed since start of deceleration, and then the EGR gas is gradually attenuated in the branch pipes 8b. On the other hand, in the surge tank 8a, the EGR rate before starting deceleration is not attenuated to "0.05" until the time of "1.5 seconds" has lapsed since the start of deceleration. It is thus confirmed that the EGR rate in the branch pipes 8b can be promptly attenuated after starting deceleration of the engine 1.

Further, in the present embodiment, the fresh air is introduced directly into each of the branch pipes 8b, not into the surge tank 8a, in order to lower the EGR gas concentration. This direct introduction of the fresh air to the branch pipes 8b makes it unnecessary to dilute the EGR gas for surplus volume, thus reducing the fresh air amount required for the EGR gas dilution. Accordingly, the fresh air is not made to flow more than necessary into each cylinder of the engine 1, thereby preventing generation of unpredicted torque increase of the engine 1.

Second Embodiment

A second embodiment embodying an engine system and an intake manifold used therefor in a gasoline engine system is now explained in detail with reference to the accompanying drawings.

Figure 3:
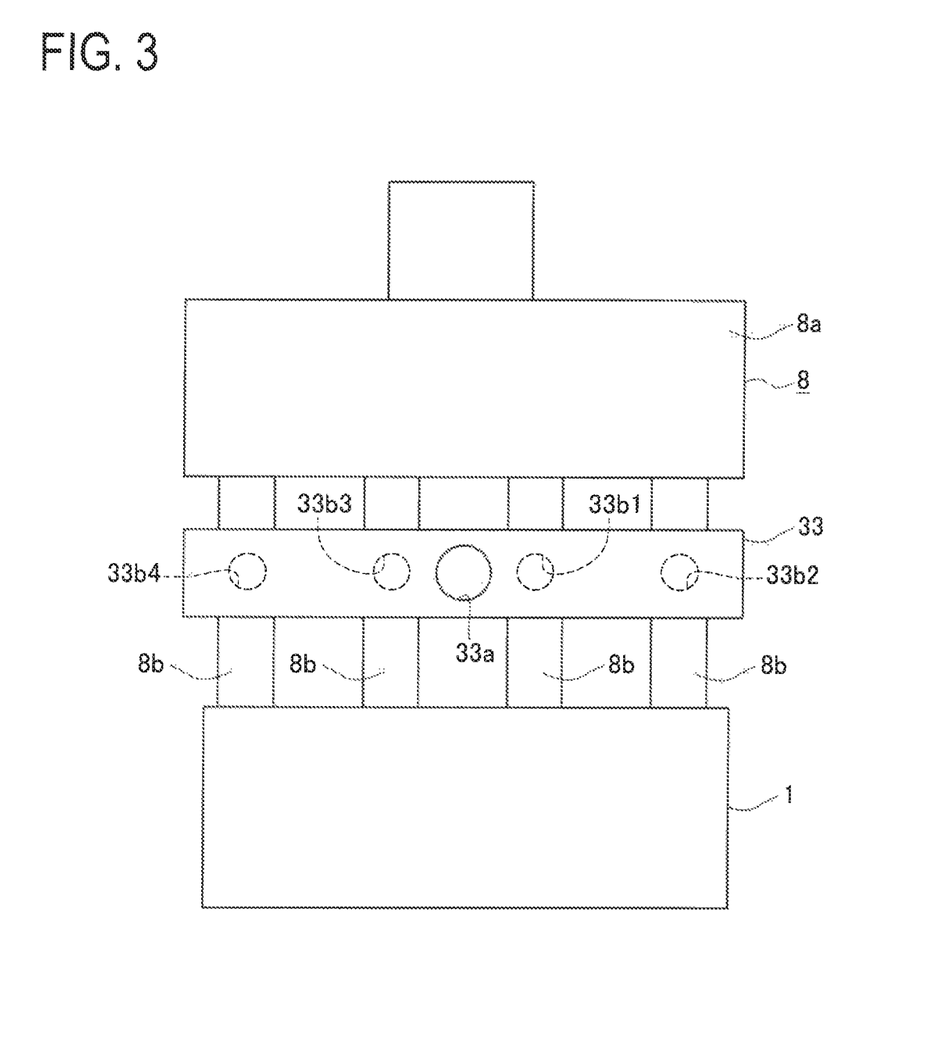
FIG. 3 is a plan view of an intake manifold including a fresh air distribution pipe and an engine in a second embodiment.

The present embodiment is different from the first embodiment in a position of a fresh air inlet 33a of a fresh air distribution pipe 33. FIG. 3 is a plan view showing an intake manifold 8 including the fresh air distribution pipe 33 and the engine 1. As shown in FIG. 3, in the present embodiment, the fresh air inlet 33a of the fresh air distribution pipe 33 is placed in a center in the longitudinal direction of the pipe 33, and two fresh air outlets 33b1 and 33b2 and two fresh air outlets 33b3 and 33b4 are symmetrically placed on right and left sides (in FIG. 3) relative to the fresh air inlet 33a.

According to the configuration of the present embodiment, the following operations and effects can be achieved other than operation and effects of the first embodiment. Specifically, the fresh air distribution pipe 33 is configured such that the fresh air inlet 33a is placed in the center in the longitudinal direction of the pipe 33, and that the two fresh air outlets 33b1 and 33b2 and the two fresh air outlets 33b3 and 33b4 are placed symmetrically on the right and left sides relative to the fresh air inlet 33a. This configuration contributes to bringing a length of a passage extending from the fresh air inlet 33a to the fresh air outlet 33b1 and a length of a passage extending from the inlet 33a to the fresh air outlet 33b3 to be almost equal. Furthermore, a length of a passage from the fresh air inlet 33a to the fresh air outlet 33b2 and a length of a passage from the inlet 33a to the fresh air outlet 33b4 can also be made almost equal to each other. Accordingly. a flow rate of the fresh air introduced in each of the branch pipes 8b is made almost equal, thus reducing variations in EGR rates in each cylinder as much as possible.

Third Embodiment

A third embodiment embodying an engine system and an intake manifold used therefor in a gasoline engine system is now explained in detail with reference to the accompanying drawings.

Figure 4:
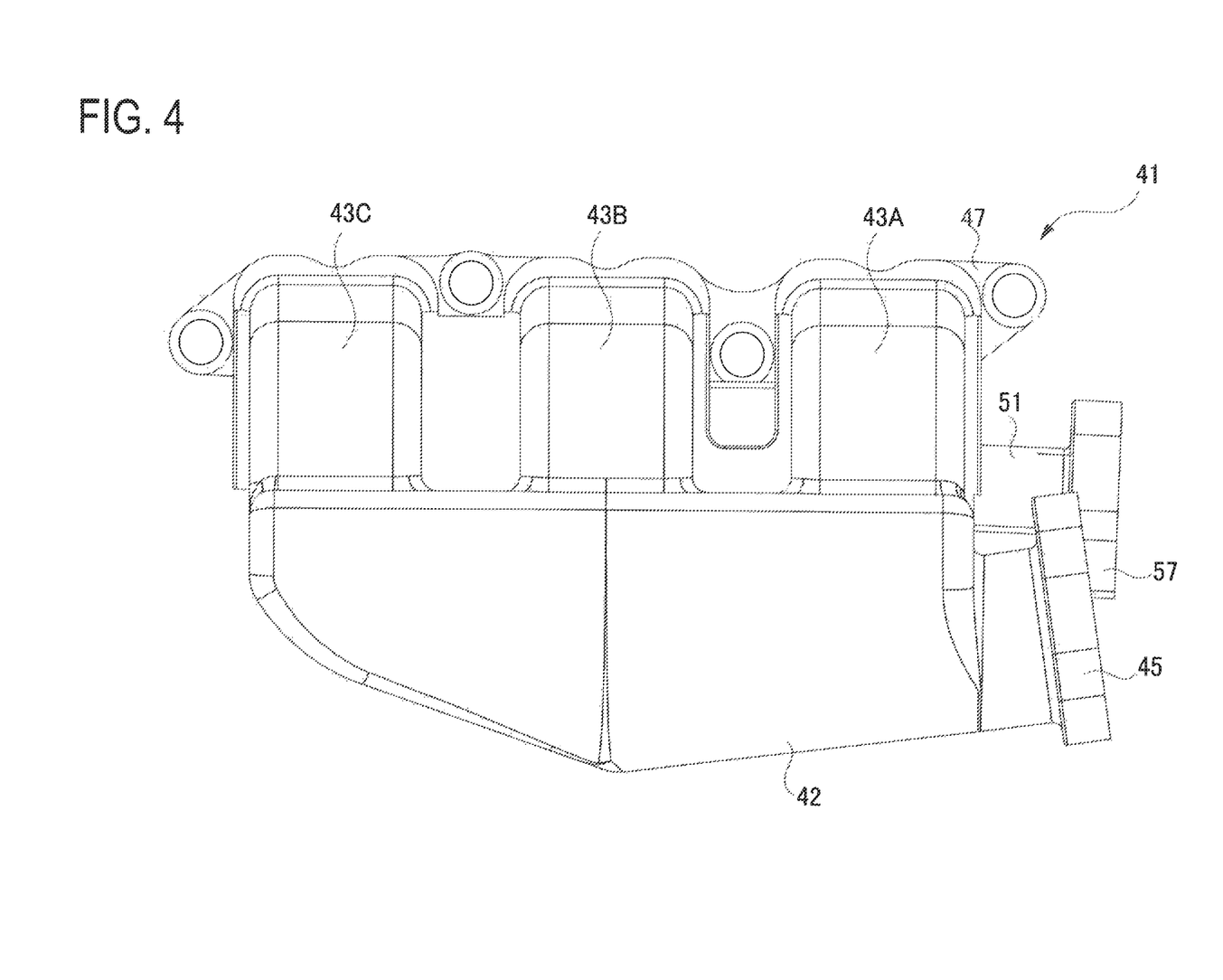
FIG. 4 is a front view of an intake manifold in a third embodiment.
Figure 5:
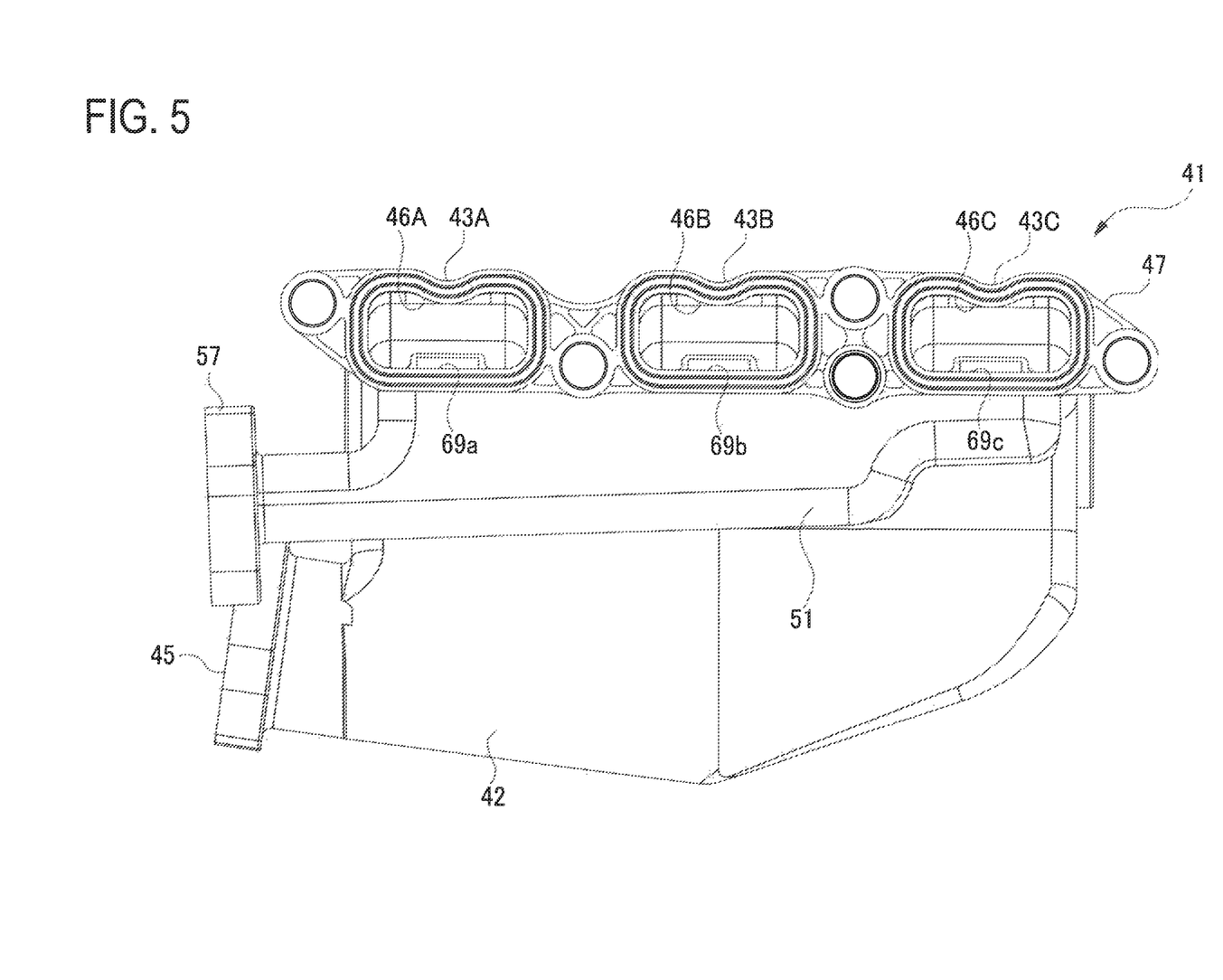
FIG. 5 is a rear side view of the intake manifold in the third embodiment.
Figure 6:
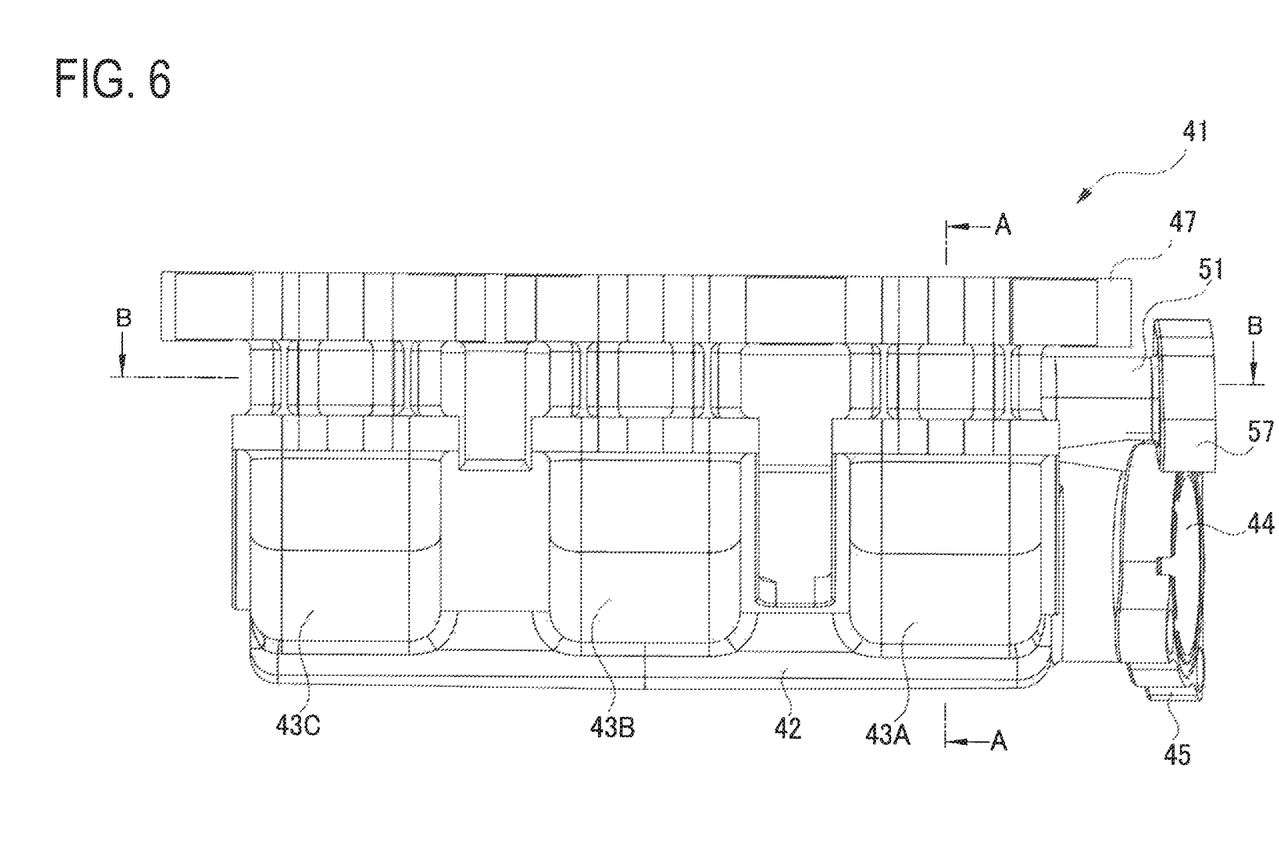
FIG. 6 is a plan view of the intake manifold in the third embodiment.
Figure 7:
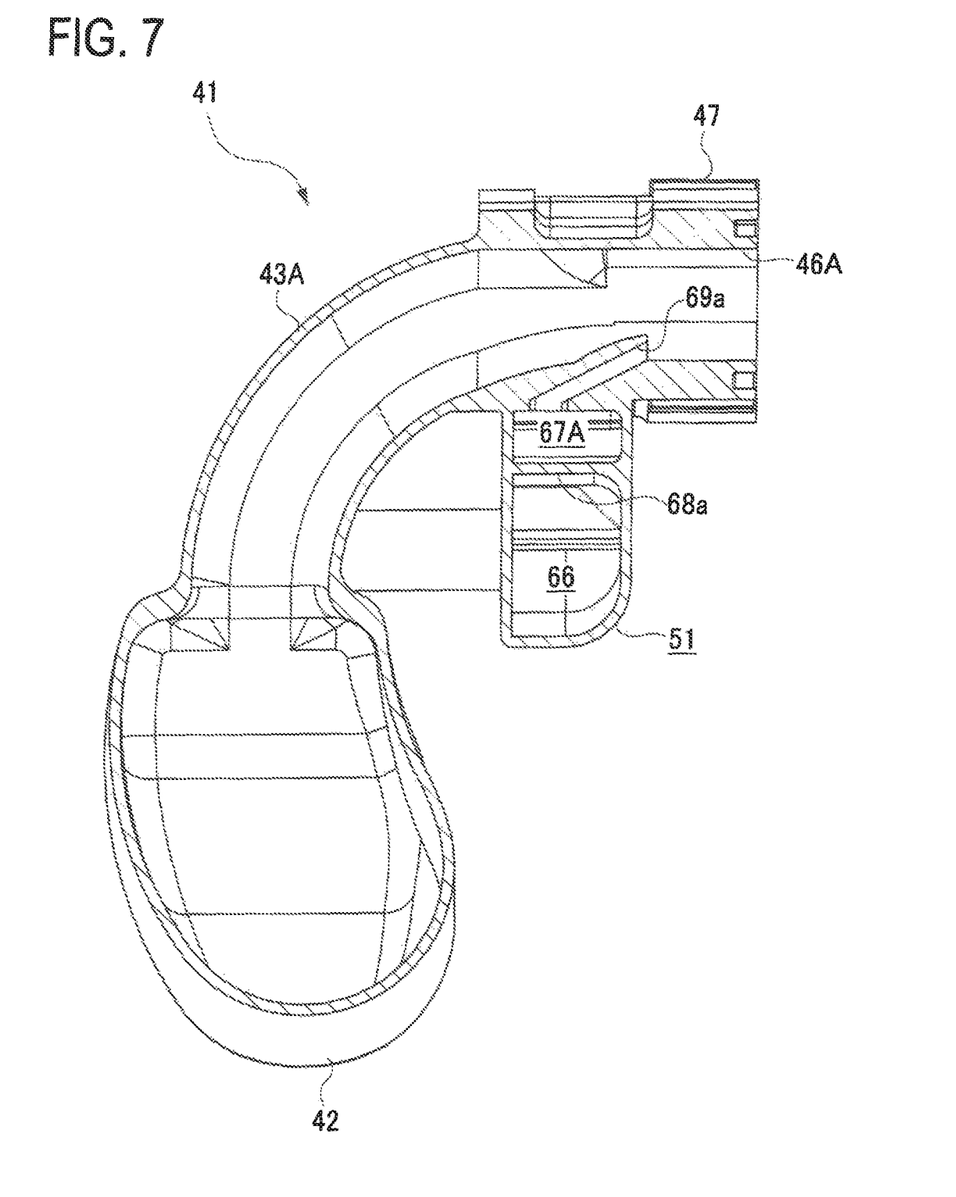
FIG. 7 is a sectional view of the intake manifold in the third embodiment, taken along a line A-A in FIG. 6.
Figure 8:
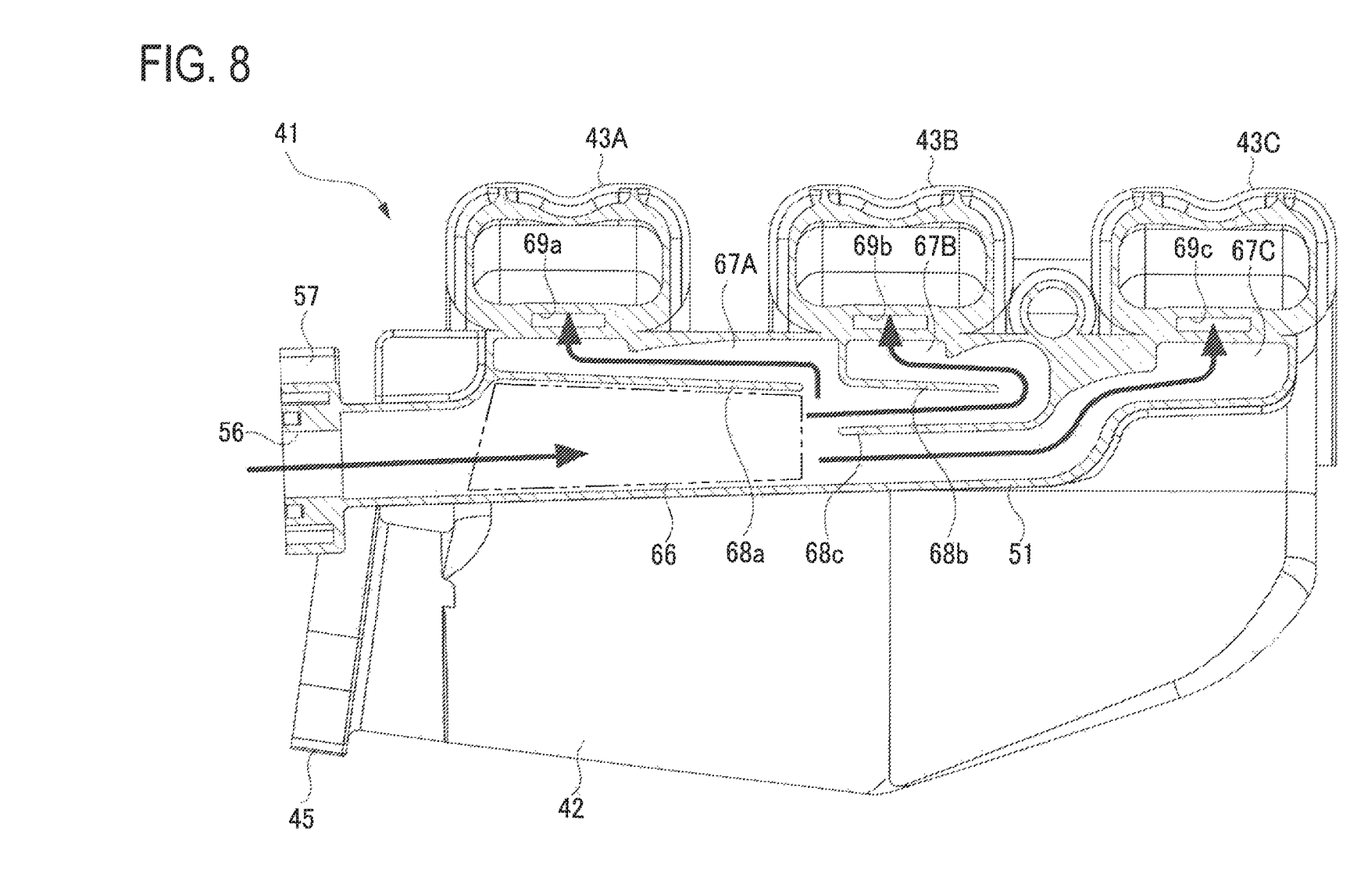
FIG. 8 is a cross-sectional view of the intake manifold in the third embodiment, taken along a line B-B in FIG. 6.

The present embodiment is different from the preceding embodiments in each configuration of an intake manifold and a fresh air distribution member. In the present embodiment, specifically, the fresh air distribution member is integrally formed with a resin-made intake manifold. FIG. 4 is a front view of an intake manifold 41. FIG. 5 is a rear side view of the intake manifold 41. FIG. 6 is a plan view of the intake manifold 41. FIG. 7 is a sectional view of the intake manifold 41 taken along a line A-A in FIG. 6. FIG. 8 is a cross-sectional view of the intake manifold 41 taken along a line B-B in FIG. 6. The intake manifold 41 is disposed in a position as illustrated in FIGS. 4 and 5 when it is to be attached to an engine, and an upper and lower direction and a left and right direction in a placement state of the intake manifold 41 are based on directions as illustrated in FIGS. 4 and 5. The intake manifold 41 is entirely made of resin and provided with a surge tank 42 and branch pipes 43A, 43B, and 43C, each branching off from the surge tank 42. The branch pipes 43A to 43C are arranged in parallel to one another to extend from the surge tank 42 and make a curve in the same direction. In the present embodiment, the intake manifold 41 is provided with three branch pipes 43A to 43C each corresponding to respective three cylinders of the engine.

As shown in FIGS. 4 to 8, the surge tank 42 is provided with an intake air inlet 44 to introduce intake air into the tank 42 (see FIG. 6). An outer circumference of the intake air inlet 44 is provided with an inlet flange 45. To the inlet flange 45, an electric throttle device is to be connected. On each downstream end of the respective branch pipes 43A to 43C, each of intake air outlets 46A, 46B, and 46C to bring intake air into each intake port of the engine is provided (see FIGS. 5 and 7). An outer circumference of the respective intake air outlets 46A to 46C is provided with an outlet flange 47. Each outlet flange 47 is connected to each intake port of the engine.

As shown in FIGS. 4 to 8, a fresh air distribution part 51 is provided on an inner side of a curved portion of the respective branch pipes 43A to 43C to distribute fresh air to each of the branch pipes 43A to 43C. The fresh air distribution part 51 corresponds to one example of a fresh air distribution member of the present disclosure.

As shown in FIGS. 4 to 8, the fresh air distribution part 51 is provided with a fresh air inlet 56 to introduce fresh air into inside of the part 51. The fresh air inlet 56 is provided with an inlet flange 57 on its outer circumference. To the inlet flange 57, a pipe of a fresh air inflow passage is to be connected via a fresh air inflow valve to bring the fresh air into the inlet 56.

As shown in FIG. 8, the fresh air distribution part 51 has a sectional shape in the longitudinal direction partly different from the one in the preceding embodiments. More specific explanation is given representatively with reference to FIG. 7, illustrating a cross-sectional view, cut orthogonally to a longitudinal direction of the fresh air distribution part 51. As shown in FIG. 7, the fresh air distribution part 51 is placed in a position close to the outlet flanges 47 of the branch pipes 43A to 43C. The fresh air distribution part 51 is in an almost rectangular shape in a cross section cut orthogonally to the longitudinal direction of the part 51. As shown in FIG. 8, the fresh air distribution part 51 is provided in its inside with a fresh air chamber 66 formed adjacent to the fresh air inlet 56 to once collect the fresh air, and fresh air distribution passages 67A, 67B, and 67C (as indicated with three different arrows in FIG. 8) each communicated with the branch pipes 43A, 43B, and 43C, respectively. The fresh air chamber 66 and each of the fresh air distribution passages 67A to 67C are partitioned by walls 68a, 68b, and 68c. As shown in FIGS. 7 and 8, the fresh air distribution passages 67A to 67C are each provided on its outlet side with respective nozzles 69a, 69b, and 69c which are communicated with the branch pipes 43A to 43C. Each of the nozzles 69a to 69c corresponds to one example of a fresh air outlet of the present disclosure.

According to the above-mentioned configuration of the present embodiment, the following operation and effects can be achieved in addition to the operation and effects of the first embodiment. Specifically, the fresh air distribution part 51 is integrally provided with a resin-made intake manifold 41, and thus the number of constituent component is reduced as compared with a configuration in which a pipe is separately provided for connecting the fresh air distribution part, thereby reducing labor of attaching components. Accordingly, a process of attaching the fresh air distribution part 51 to the intake manifold 41 is omitted, achieving simplification and reduction in manufacturing cost of a gasoline engine system provided with a fresh air inflow passage.

According to the present embodiment, the fresh air is allowed to flow through the fresh air inflow passage to the fresh air distribution part 51 and then further flow into the fresh air distribution passages 67A to 67C branching off form the fresh air inlet 56, and thus the fresh air is further distributed to each of the branch pipes 43A to 43C to form the respective nozzles 69a to 69c. Accordingly, the fresh air can be made flown at an appropriate flow rate to the branch pipes 43A to 43C.

Further, according to the configuration of the present embodiment, the intake manifold 41 is made of resin, lightening weight of the intake manifold 41. Moreover, the fresh air distribution part 51 is placed inside the curved portion of the curved branch pipes 43A to 43C, thus preventing the fresh air distribution part 51 from protruding outside of the intake manifold 41. Accordingly, the intake manifold 41 is reduced in its size, improving attachability to the engine and mountability on a vehicle.

Forth Embodiment

A forth embodiment embodying an engine system and an intake manifold used for the engine system in a gasoline engine system is explained in detail with reference to the accompanying drawings.

Figure 9:
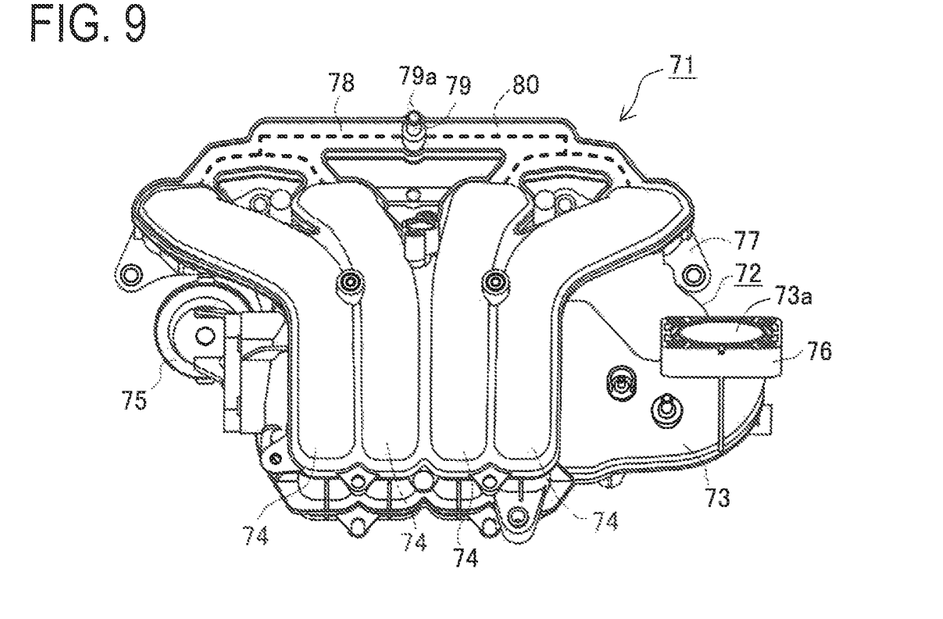
FIG. 9 is a front view of an intake manifold in a forth embodiment.

The present embodiment is different from the third embodiment in an installation of a fresh air distribution member in an intake manifold. In the present embodiment, too, the fresh air distribution member is formed integral with a resin-made intake manifold. FIG. 9 is a front view of an intake manifold 71 of the present embodiment, and FIG. 10 is a left-side view of the intake manifold 71.

The intake manifold 71 is provided with a resin-made manifold body 72. The manifold body 72 is provided with a surge tank 73 connected to an intake passage and a plurality of branch pipes 74 each branching off from the surge tank 73. In the present embodiment, the intake manifold 71 includes four branch pipes 74, each pipe corresponding to each one of four cylinders of an engine. The intake manifold 71 is internally provided with a variable intake valve (not-shown) and a diaphragm actuator 75 to open and close the variable intake valve.

Figure 10:
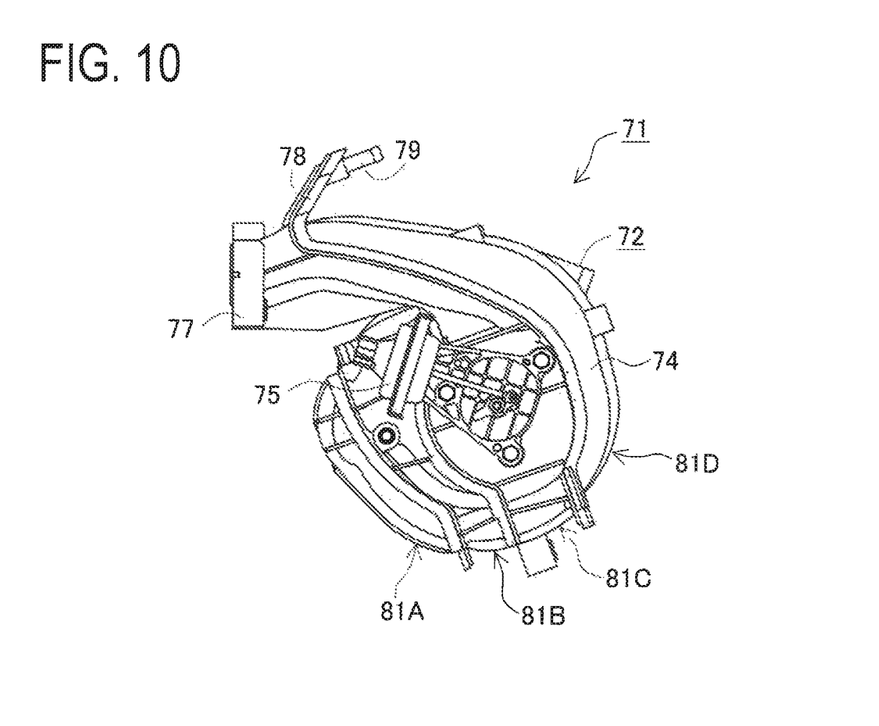
FIG. 10 is a left-side view of the intake manifold in the forth embodiment.

As shown in FIGS. 9 and 10, an intake inlet 73a of the surge tank 73 is provided with an inlet flange 76. This inlet flange 76 is configured to be connected to an electric throttle device. The intake manifold 71 is provided on its rear side with an outlet flange 77 connected to the engine. The outlet flange 77 is formed with intake outlets 74a (see FIG. 11) of the branch pipes 74. In the vicinity of the intake outlets 74a of the branch pipes 74, namely, near the outlet flange 77, a fresh air distribution part 78 including a fresh air distribution passage 80 therein is provided. The fresh air distribution part 78 is arranged to be located on a top side of the respective branch pipes 74, namely, on an upper side of the intake manifold 71 in a state of use of the intake manifold 71. As shown in FIGS. 9 and 10, the fresh air distribution part 78 is in a flat plate-like shape as extending obliquely upward on the upper side of the intake manifold 71. In a central portion of the fresh air distribution part 78, one pipe joint 79 is provided in a protruding manner. One fresh air inlet 79a to introduce the fresh air is provided as corresponding to the pipe joint 79. As shown in FIG. 9, a front shape of the fresh air distribution part 78 and the fresh air distribution passage 80 (as indicated with a broken line in FIG. 9) formed inside the distribution part 78 is formed to branch off from the pipe joint 79 (the fresh air inlet 79a) to the respective branch pipes 74 stepwise (in two steps) in a symmetrical manner about the joint pipe 79 (the fresh air inlet 79a), which is so-called "a tournament-chart-like branch shape."

In the present embodiment, the manifold body 72 is formed by integrally joining a plurality of resin-molded bodies which have been resin-molded and divided into plural bodies in advance. The manifold body 72 is formed by integrally joining four resin-molded bodies 81A, 81B, 81C, and 81D to one another.

Figure 11:
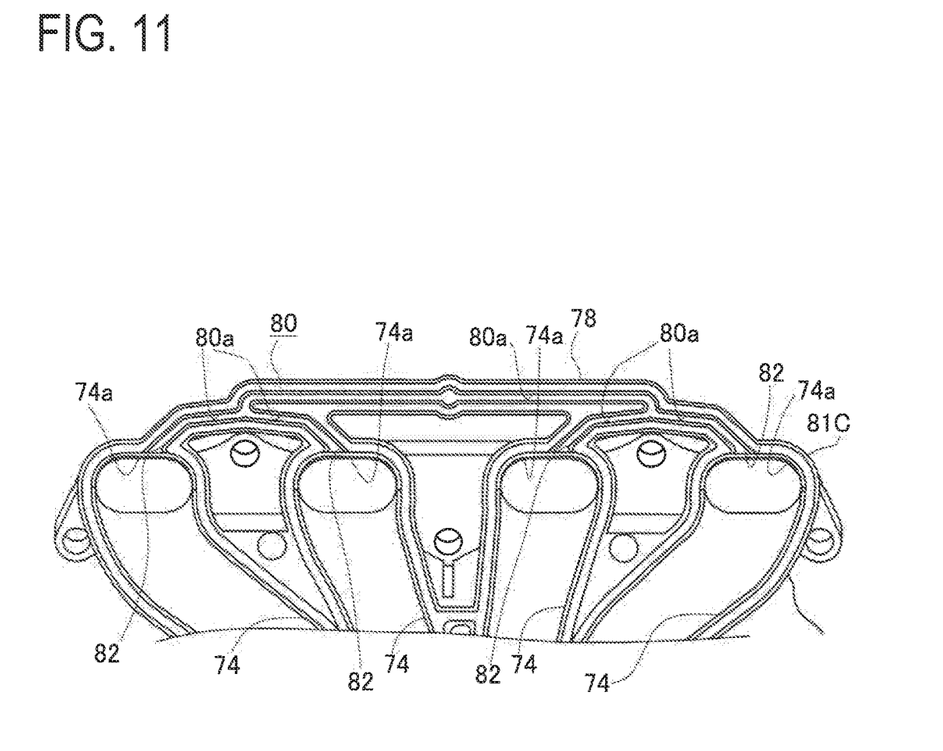
FIG. 11 is a rear side view showing a part of one of resin molding bodies in the forth embodiment.

FIG. 11 is a partial back side view of one resin molded body 81C. As shown in FIG. 11, a joined surface of the fresh air distribution part 78 is formed with passage grooves 80a constituting the fresh air distribution passage 80. Each distal end of the passage grooves 80a is communicated with the respective branch pipes 74 so that fresh air outlets 82 are made to open and communicate with each of the branch pipes 74. The shape of the passage grooves 80a represents an entire shape of the fresh air distribution passage 80. As shown in FIG. 11, the fresh air inlet 79a (see FIGS. 9 and 10), the fresh air outlets 82, and the fresh air distribution passage 80 are provided close to the intake outlets 74a of the branch pipes 74 on the top side of the branch pipes 74 in the state of use. The fresh air inlet 79a is placed on an upper side and the fresh air outlets 82 are placed on a lower side in the state of use.

According to the above-explained present embodiment, the following operations and effects are achieved in addition to the operation and effects of the first embodiment. Specifically, the fresh air distribution part 78 is formed integral with the resin-made manifold body 72, achieving reduction in the number of constituent components as compared with an example of separately providing a pipe for joining a fresh air distribution part, thereby, reducing the labor of assembling components. Therefore, simplification of a gasoline engine system and reduction in manufacturing cost can be achieved.

According to the configuration of the present embodiment, the fresh air distribution passages 80 of the fresh air distribution part 78 each branch off stepwise from the fresh air inlet 79a and extending to the respective fresh air outlets 82, thus forming a symmetrical tournament-chart-like branching shape about the fresh air inlet 79a. Accordingly, the fresh air introduced from the fresh air inlet 79a is made to be evenly distributed stepwise in each of branching portions before reaching the respective fresh air outlets 82. Thus, use of the intake manifold 71 attached to the engine enables even distribution of fresh air to the cylinders of the engine.

In general, an outlet of respective branch pipes of an intake manifold is directly connected to an intake port of an engine. The intake port is thus subjected to negative pressure at an amount almost equal to that of the negative pressure generated in each cylinder of the engine. By the intake manifold 71 of the present embodiment, the fresh air inlet 79a, the fresh air outlets 82, and the fresh air distribution passage 80 which are provided in the fresh air distribution part 78 are placed close to the intake outlets 74a of the branch pipes 74, and thus each fresh air outlet 82 is placed close to the intake port. Accordingly, even if there is a difference in each length of the respective branch pipes 74, each fresh air outlet 82 is subjected to negative pressure at the amount almost equal to that of the negative pressure generated in each cylinder of the engine. Therefore, fresh air can be further evenly distributed in each cylinder of the engine irrespective of differences among lengths of the respective branch pipes 74.

Further in the present embodiment, the fresh air inlet 79a, the fresh air outlets 82, and the fresh air distribution passage 80 which are provided in the fresh air distribution part 78 are placed on the top side of the branch pipes 74 in a state of use of the engine, and the fresh air inlet 79a is placed on the upper side and the fresh air outlets 82 are placed on the lower side. Thus, the fresh air distribution passage 80 is a passage facing downward from the fresh air inlet 79a to the respective fresh air outlets 82. This placement of the fresh air distribution passage 80 leads to a downward flow of water having entered in the fresh air distribution passage 80, thus preventing the water from staying in the passage 80. Accordingly, the flow of fresh air in the fresh air distribution passage 80 can be continuously kept in a preferable state.

According to the configuration of the present embodiment, the manifold body 72 is made of resin, and thus the weight of the intake manifold 71 can be reduced. Further, the fresh air inlet 79a and the fresh air distribution passage 80 are provided in the fresh air distribution part 78, which is integrally formed with the branch pipes 74, and made to extend upward. This configuration makes it easy to form the fresh air distribution passage 80 as compared with a case of forming the fresh air distribution passage 80 inside the manifold body 72. Accordingly, the intake manifold 71 (the manifold body 72) provided with the fresh air distribution passage 80 can be easily manufactured by resin molding, further achieving weight reduction.

The present disclosure is not limited to each of the above-mentioned embodiments, and may be partly modified its configuration without departing from the scope of the disclosure.

Figure 12:
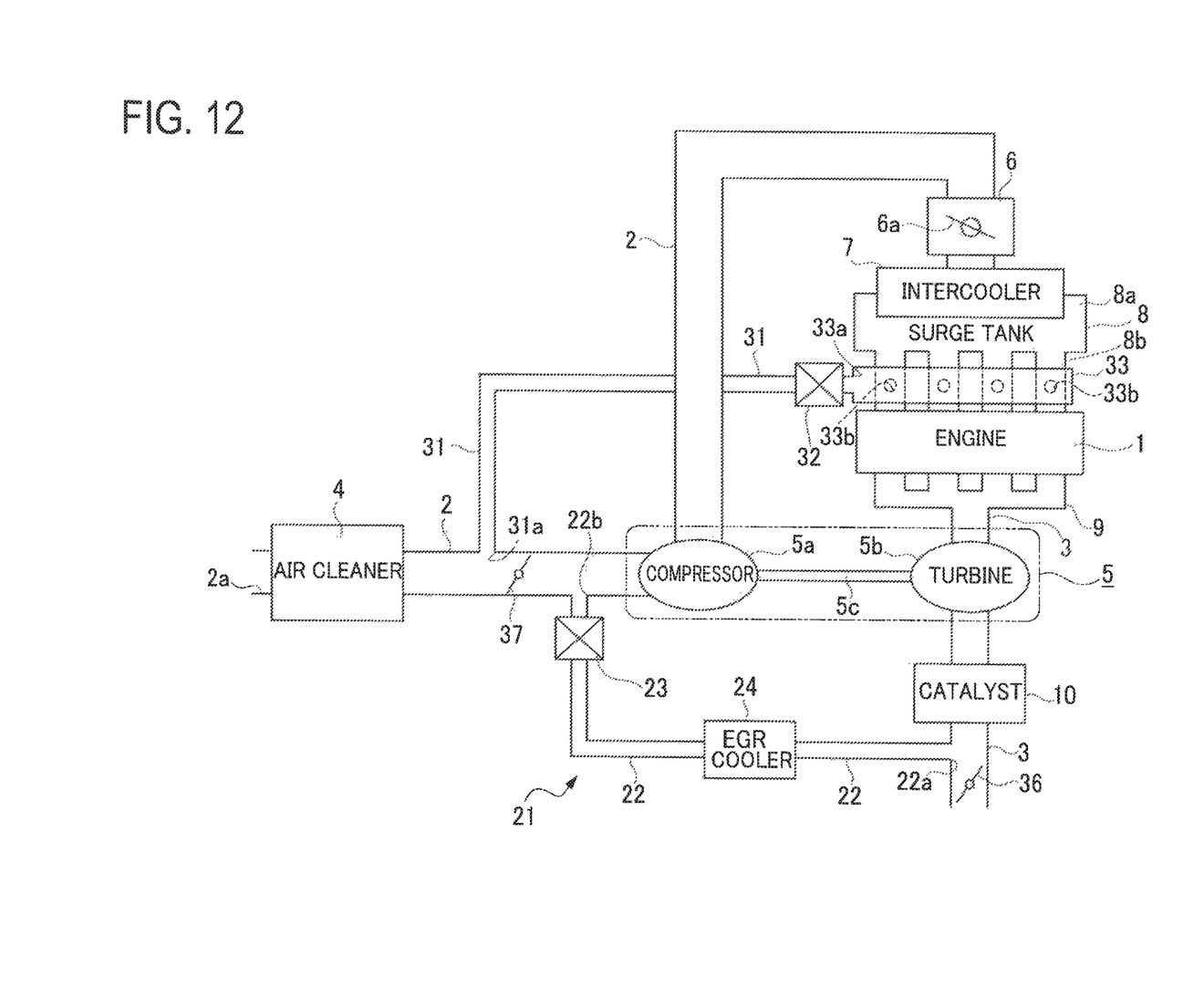
FIG. 12 is a schematic configurational view of a gasoline engine system in a modified embodiment.

Unlike the gasoline engine system of the above embodiments, an exhaust air discharge valve 36 to control back pressure may be provided in an exhaust passage 3 downstream of an inlet 22a of an EGR passage 22, or an intake air throttle valve 37 to generate negative pressure may be provided in an intake passage 2 upstream of an outlet 22b of the EGR passage 22 as shown in FIG. 12. Thus, the EGR gas can be further smoothly let flown through the EGR passage 22. FIG. 12 is a schematic configurational view corresponding to FIG. 1 illustrating the gasoline engine system.

In the above embodiments, the intake manifold including the fresh air distribution member is embodied as the intake manifolds 8, 41, and 71 which are attached to an engine having three or four cylinders. In other words, the number of the branch pipes are arranged three or four. As an alternative, the number of the branch pipes of the intake manifold may be increased or reduced as appropriate.

In the above-mentioned third and forth embodiments, the fresh air distribution parts 51 and 78 are integrally formed of resin material with the resin-made intake manifolds 41 and 71, respectively. As one alternative, a fresh air distribution part made by different material may be integrally formed with the intake manifold by joint or insert molding.

In the above embodiments, the present disclosure is embodied in a gasoline engine system, but alternatively, the present disclosure may be embodied in a diesel engine system.

INDUSTRIAL APPLICABILITY

The present disclosure can be utilized for a gasoline engine system or a diesel engine system and an intake manifold used therefor.

REFERENCE SIGNS LIST

1 Engine
2 Intake passage
3 Exhaust passage
5 Supercharger
5a Compressor
5b Turbine
5c Rotary shaft
6 Electric throttle apparatus (Intake amount regulation apparatus)
8 Intake manifold
8a Surge tank
8b Branch pipe
21 EGR device (Exhaust gas recirculation device)
22 EGR passage (Exhaust gas recirculation passage)
22a Inlet port
22b Outlet port
23 EGR valve (Exhaust gas recirculation valve)
18
31 Fresh air inflow passage
31a Inflow port
32 Fresh air inflow valve
33 Fresh air distribution pipe (Fresh air distribution member)
33a Fresh air inlet
33b Fresh air outlet
41 Intake manifold
42 Surge tank
43A Branch pipe
43B Branch pipe
43C Branch pipe
51 Fresh air distribution part (Fresh air distribution member)
56 Fresh air inlet
67A Fresh air distribution passage
67B Fresh air distribution passage
67C Fresh air distribution passage
69a Nozzle (Fresh air outlet)
69b Nozzle (Fresh air outlet)
69c Nozzle (Fresh air outlet)
71 Intake manifold
72 Manifold body
73 Surge tank
74 Branch pipe
78 Fresh air distribution part (Fresh air distribution member)
79a Fresh air inlet
80 Fresh air distribution passage
82 Fresh air outlet

What is claimed is:

1. Engine system comprising:
an engine including a plurality of cylinders;
an intake passage configured to introduce intake air into the respective cylinders of the engine;
an exhaust passage allowing exhaust gas to flow out of the engine;
a supercharger provided in the intake passage and in the exhaust passage to increase intake pressure in the intake passage,
wherein the supercharger includes a compressor placed in the intake passage, a turbine placed in the exhaust passage, and a rotary shaft integrally rotatably connecting the compressor and the turbine;
an intake manifold placed in the intake passage immediately upstream of the engine, the intake manifold including a surge tank to which the intake air is introduced and a plurality of branch pipes configured to distribute the intake air introduced in the surge tank to the respective cylinders of the engine;
an intake amount regulation valve placed in the intake passage upstream of the intake manifold, the intake amount regulation valve configured to regulate an intake amount of the intake air flowing in the intake passage;
an exhaust gas recirculation apparatus including an exhaust gas recirculation passage configured to allow a part of exhaust gas discharged from the engine to the exhaust passage to flow in the intake passage as exhaust gas recirculation gas and to be recirculated into the engine, and an exhaust gas recirculation valve configured to regulate an exhaust gas recirculation gas flow rate in the exhaust gas recirculation passage,
wherein the exhaust gas recirculation passage includes an inlet port connected to the exhaust passage downstream of the turbine and an outlet port connected to the intake passage upstream of the compressor;
a fresh air inflow passage configured to introduce fresh air to the intake passage downstream of the intake flow rate regulation valve,
wherein the fresh air inflow passage includes an inlet connected to the intake passage upstream of the outlet port of the exhaust gas recirculation passage;
a fresh air inflow valve configured to regulate a fresh air amount of fresh air flowing in the fresh air inflow passage,
wherein the engine system is provided with a fresh air distribution member on an outlet side of the fresh air introduction passage to distribute the fresh air into each of the branch pipes of the intake manifold.

2. The engine system according to claim 1, wherein the fresh air distribution member includes a fresh air inlet to which the fresh air is introduced, flesh air outlets, each of which is formed in the respective branch pipes, and a fresh air distribution passage branching off to distribute the fresh air introduced from the fresh air inlet to the fresh air outlets.

3. The intake manifold, provided in the engine system according to claim 1, is integrally provided with the fresh air distribution member.

4. The intake manifold, provided in the engine system according to claim 2, is integrally provided with the fresh air distribution member.

* * * * *